United States Patent
Krisl et al.

(10) Patent No.: US 7,331,447 B2
(45) Date of Patent: Feb. 19, 2008

(54) ROD RETAINING SNAP ROD WITH ENLARGED RETAINING RING

(75) Inventors: Michal Krisl, Basel (CH); Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 104 days.

(21) Appl. No.: 11/278,602

(22) Filed: Apr. 4, 2006

(65) Prior Publication Data

US 2006/0201791 A1 Sep. 14, 2006

Related U.S. Application Data

(63) Continuation-in-part of application No. 10/891,807, filed on Jul. 15, 2004, now Pat. No. 7,108,127.

(60) Provisional application No. 60/489,824, filed on Jul. 24, 2003.

(51) Int. Cl.
*B65G 17/06* (2006.01)
*B65G 17/38* (2006.01)

(52) U.S. Cl. ............... 198/853; 198/850; 198/851; 198/852

(58) Field of Classification Search ......... 198/850–853
See application file for complete search history.

(56) References Cited

U.S. PATENT DOCUMENTS

| | | |
|---|---|---|
| 586,956 A | 7/1897 | Barker et al. |
| 812,655 A | 2/1906 | Johnson |
| 2,649,812 A | 8/1953 | Wylie |
| 2,852,129 A | 9/1958 | Conner |
| 3,269,526 A | 8/1966 | Imse et al. |
| 3,631,965 A | 1/1972 | Koshkin et al. |
| 4,153,152 A | 5/1979 | Lapeyre |
| 4,505,383 A | 3/1985 | Wheeldon |
| 4,597,492 A | 7/1986 | Lachonius et al. |
| 4,709,807 A | 12/1987 | Poerink |
| 4,858,753 A | 8/1989 | Hodlewsky |
| 4,911,681 A | 3/1990 | Funkhouser |
| 5,058,732 A | 10/1991 | Lapeyre |
| 5,105,938 A | 4/1992 | Tan |
| 5,156,264 A | 10/1992 | Lapeyre |
| 5,547,071 A | 8/1996 | Palmaer et al. |
| 5,573,106 A | 11/1996 | Stebnicki |
| 5,598,916 A | 2/1997 | Horton et al. |
| 5,645,160 A | 7/1997 | Palmaer |
| 5,662,211 A | 9/1997 | Quentin |
| 5,678,683 A | 10/1997 | Stebnicki et al. |

(Continued)

FOREIGN PATENT DOCUMENTS

| | | |
|---|---|---|
| EP | 0 787 664 A | 8/1997 |
| EP | 0 960 839 A | 12/1999 |

*Primary Examiner*—Douglas A Hess
(74) *Attorney, Agent, or Firm*—Hodgson Russ LLP

(57) ABSTRACT

A modular belt having modules intercalated and locked into position by a pivot rod having a retaining ring disposed in spaced apart relation relative to the end of the rod along the longitudinal axis. An outermost link end of the first plurality of link ends of the module has an opening that is larger in diameter and offset from the openings in the remaining link ends. The opening in the outermost link end may be substantially oblong-shaped with a portion of the opening coinciding with the remaining openings. The oblong shape improves the rod retaining function.

21 Claims, 16 Drawing Sheets

U.S. PATENT DOCUMENTS

| | | |
|---|---|---|
| 5,826,705 A | 10/1998 | Ramsey et al. |
| 5,899,322 A | 5/1999 | Gamble, Jr. |
| 5,960,937 A | 10/1999 | Stebnicki et al. |
| 6,036,002 A | 3/2000 | Kobayashi et al. |
| 6,213,292 B1 | 4/2001 | Takahashi et al. |
| 6,308,825 B1 | 10/2001 | Nakamura |
| 6,330,941 B1 | 12/2001 | Guldenfels |
| 6,516,944 B2 | 2/2003 | Guldenfels |
| 6,523,680 B2 | 2/2003 | Guldenfels |
| 6,527,106 B2 | 3/2003 | Tanabe et al. |
| 6,910,572 B2 * | 6/2005 | Shibayama et al. ...... 198/844.1 |
| 7,073,662 B2 * | 7/2006 | Neely et al. ................. 198/850 |
| 7,080,729 B2 * | 7/2006 | Guldenfels et al. ...... 198/844.1 |
| 7,108,127 B2 * | 9/2006 | Krisl ........................... 198/853 |
| 7,168,557 B2 * | 1/2007 | Mitchell et al. ............. 198/852 |
| 7,255,227 B2 * | 8/2007 | Melancon ................... 198/853 |

* cited by examiner

ROD RETAINING SNAP ROD WITH ENLARGED RETAINING RING

CROSS-REFERENCE TO RELATED APPLICATION

The present application is a continuation-in-part of U.S. patent application Ser. No. 10/891,807 filed Jul. 15, 2004, now U.S. Pat. No. 7,108,127 which claims priority to U.S. Provisional Patent Application No. 60/489,824 filed Jul. 24, 2003, entitled "Rod Retaining Snap Rod with Enlarged Retaining Ring," which is incorporated herein by reference.

FIELD OF INVENTION

The present invention relates to modular conveying apparatus.

BACKGROUND OF THE INVENTION

Because they do not corrode, are light weight, and are easy to clean, unlike metal conveyor belts, plastic conveyor belts are used widely, especially in materials handling and conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are interconnected with link ends of an adjacent row. A pivot rod journaled in the aligned apertures of the side-by-side and end-to-end connected modules forms a hinge between adjacent rows. Rows of belt modules are then connected together to form an endless conveyor belt capable of articulating about a drive sprocket.

The retention of the pivot rod is an important feature of the modular plastic conveyor belts. Rod retention can be accomplished by enlarging the heads of the pivot rods at both ends but such would not allow for disassembly without destroying the rod head. Headless rods have been used for easier production and belt assembly. These type of rods must be blocked at both ends of the belt during use. In addition headless rods are often difficult to remove for disassembly.

One approach to rod retention is to have a head at one end of a rod and a headless section at the opposite end. The headed rod is furnished with a rod retaining ring disposed on the shaft at a distance from the head portion of the rod. The rod is inserted through the pivot holes of the module links, which are all exactly the same diameter. The retaining ring is just a little bit larger in diameter than the pivot hole of the outermost link, such that the ring may be forced through the pivot hole of the outermost link end and is able to expand behind the link. In this arrangement the rod is kept firmly in position by the retaining ring. The system described above has the drawback that it requires tight tolerances of the hole diameter of the outermost link and the retaining ring diameter. In practice, there is a risk that the rod does not retain well enough or is retained tightly and cannot be easily disassembled. In addition, if the retaining ring is a little too large, it may be sheared off when inserted.

What is needed is a device that makes the above-described tolerances less critical.

SUMMARY OF THE INVENTION

The present invention meets the above-described need by providing a snap rod system such that the retaining ring can be made larger in order to increase the size of the shoulder which engages behind the link face. At the same time due to the larger ring diameter the bore of the outermost link needs to be enlarged accordingly in order to allow the larger retaining ring to be moved through the bore. Due to the larger difference between the retaining ring and the rod diameter, the tolerance becomes less critical. In one embodiment, the bore of the outermost link end is slightly eccentric in such a way that the enlarged shoulder of the retaining ring will be clearly overlapping the link face when assembled. When the belt is under tension the rod will be firmly forced into this retaining position, without losing the ability to transmit the belt pull.

DETAILED DESCRIPTION OF THE INVENTION

Figure 1:
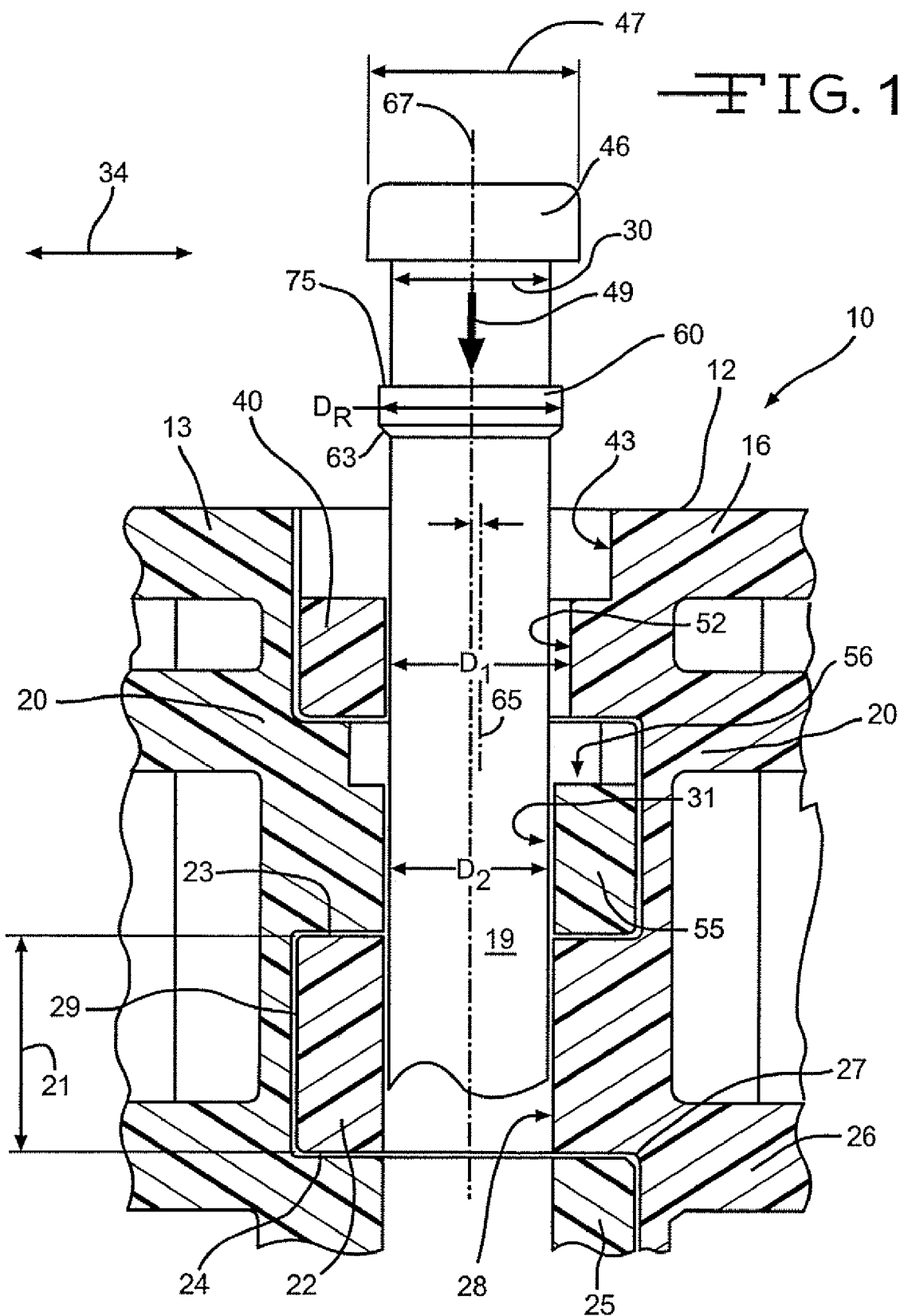
FIG. 1 is a cross-sectional plan view of the belt and pivot rod of the present invention with the pivot rod extending from the end of the belt prior to installation.

In FIGS. 1-4, a modular belt 10 is formed from a plurality of belt modules as will be evident to those of ordinary skill in the art. In FIG. 1, the outermost modules 13, 16 are shown. As will be evident to those of ordinary skill in the art, the belt 10 may be formed into varying widths in bricklayed fashion in a direction perpendicular to the direction of belt travel 34.

Each module 13, 16 has a module body 20 with a first and second plurality of link ends 22, 25 disposed in the middle of the module with respect to the outer edge 12 shown at the top of FIG. 1. Each link end 22, 25 has opposed side walls 23, 24 defining a first transverse thickness 21. The first transverse thickness 21 is connected to the intermediate section 26 of the module body 20 at a first proximal portion 27. The transverse thickness extends from the intermediate section 26 in a direction of belt travel to a first distal portion 29.

The link ends 22, 25 include openings 28, 31 disposed transverse to the direction of belt travel 34. The openings 28 and 31 receive the pivot rod 19 when adjacent belt modules 13, 16 are intercalated as shown in the figure.

The pivot rod 19 is typically round and has a diameter 30 such that the modules 13, 16 are capable of pivoting relative to each other for articulating about a sprocket (not shown). The pivot rod 19 has an end portion 46 with a diameter 47 that is greater than the diameter 30 of the pivot rod 19. The pivot rod 19 also includes a retaining ring 60 spaced apart longitudinally from the end portion 46. The retaining ring 60 has a diameter Dr that is larger than the diameter of the pivot rod 19 and may be formed with a chamfered or beveled edge 63.

Figure 4:
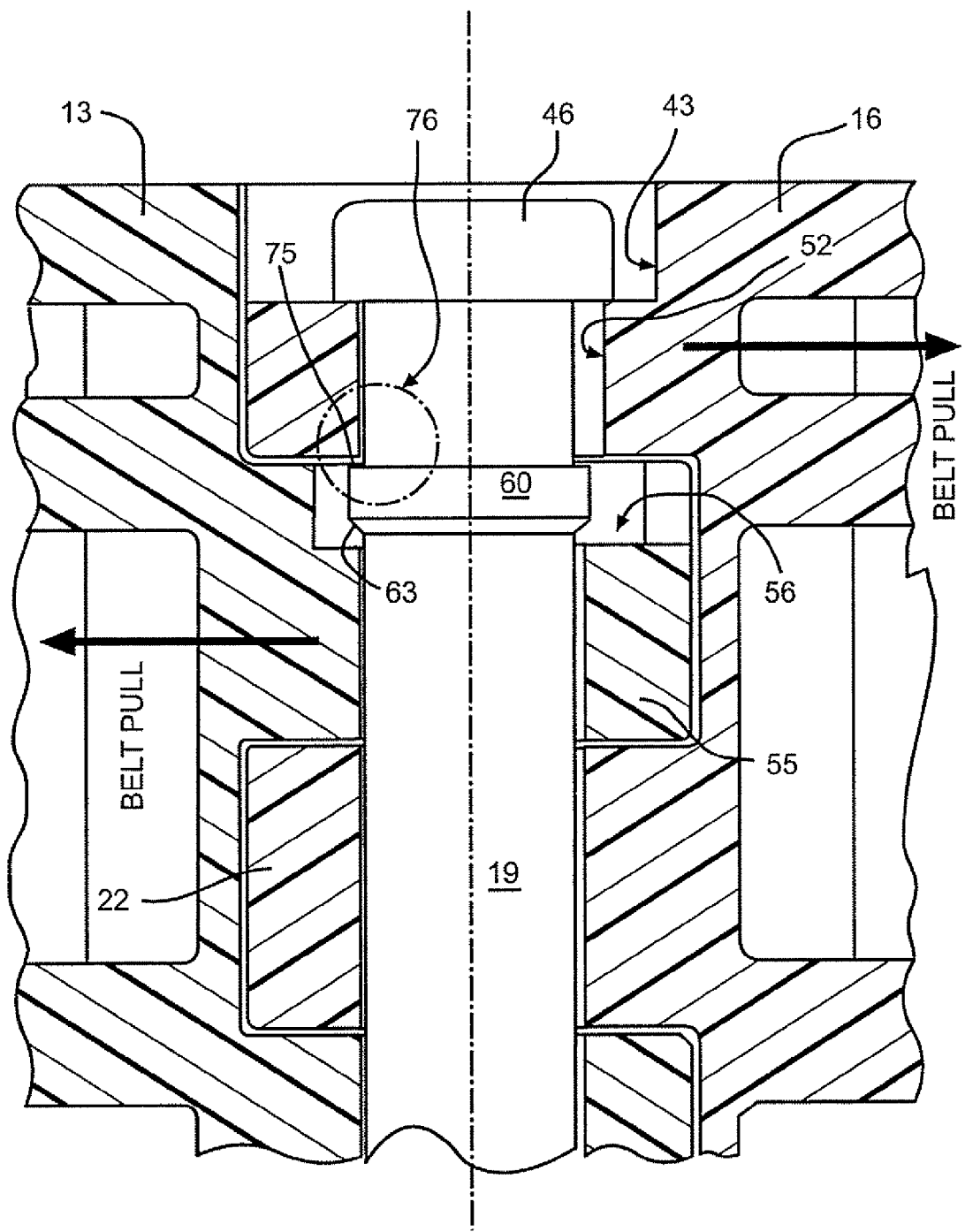
FIG. 4 is a cross-sectional plan view of the belt and pivot rod of FIG. 1 shown in the installed configuration.

Outermost link end 40 of module 16 is disposed toward the edge 12 of belt 10. The outermost link end 40 has a recessed portion 43 that is capable of receiving end portion 46 of pivot rod 19. When the pivot rod 19 is installed in the belt 10 in the direction indicated by arrow 49, the end portion 46 is received in the recessed portion 43 and abuts with the portion of the link end surrounding aperture 52 as shown in FIG. 4.

Link end 40 has an opening 52 with a diameter $D_1$ that is approximately equal to or slightly smaller than the diameter $D_r$ of the ring 60 but is larger than the diameter $D_2$ of openings 28, 31.

Belt module 13 also has a specially formed outermost link end 55 having a recessed surface 56.

Figure 3:
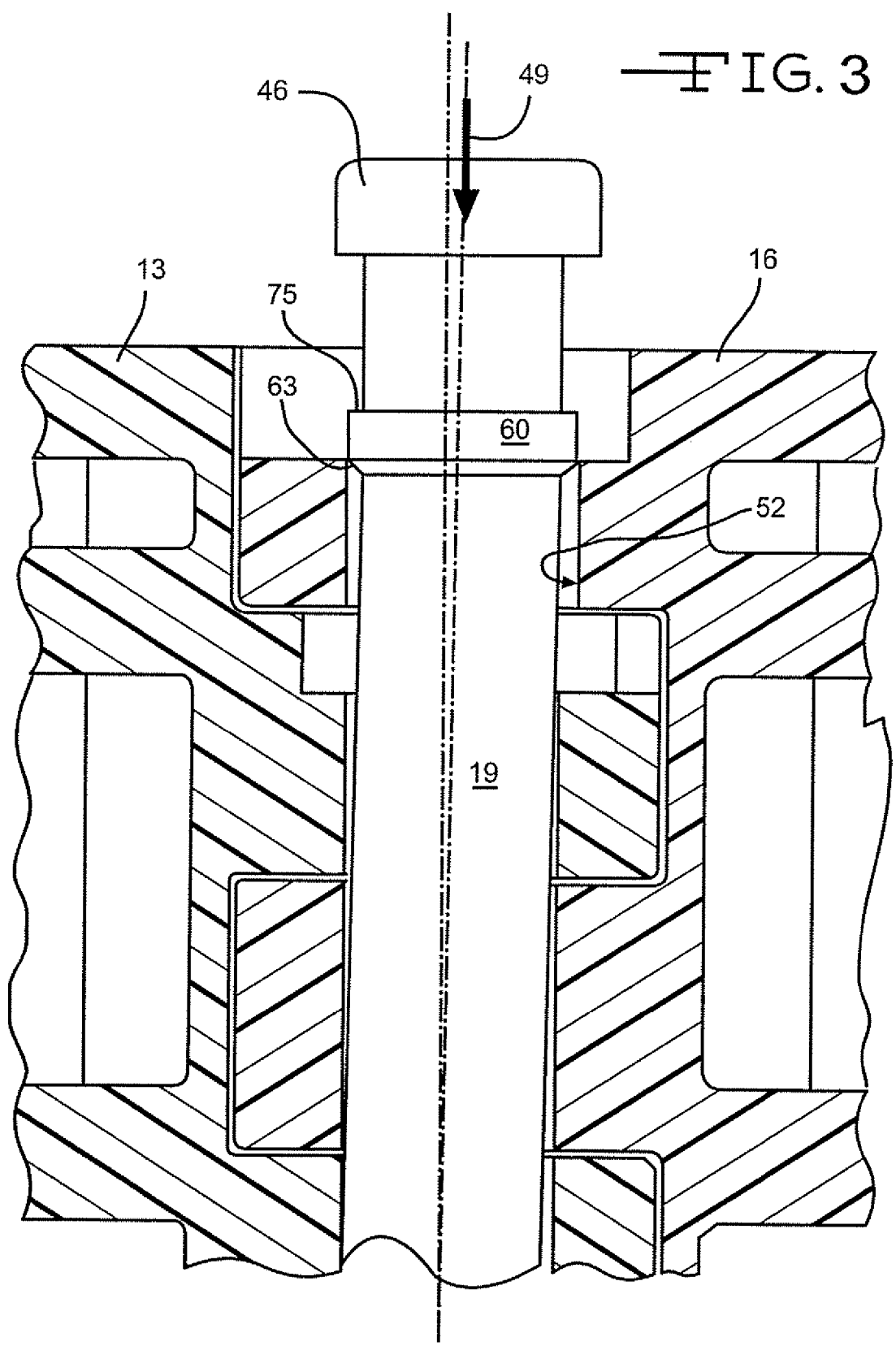
FIG. 3 is a cross-sectional plan view of the belt and pivot rod during a later stage of installation.

The central longitudinal axis 65 of aperture 52 is offset from the central longitudinal axis 67 of openings 28, 31 such that upon insertion, the pivot rod 19 is bent as shown in FIG. 3. The pivot rod 19 is bent during insertion such that once the ring 60 clears aperture 52, the enlarged shoulder 75 overlaps the link face surrounding aperture 52 as shown in the circled area 76 in FIG. 4. The axial misalignment between the apertures 52 and 31 ensures that the ring 60 does not exit from the aligned modules 13 and 16 after installation.

Figure 2:
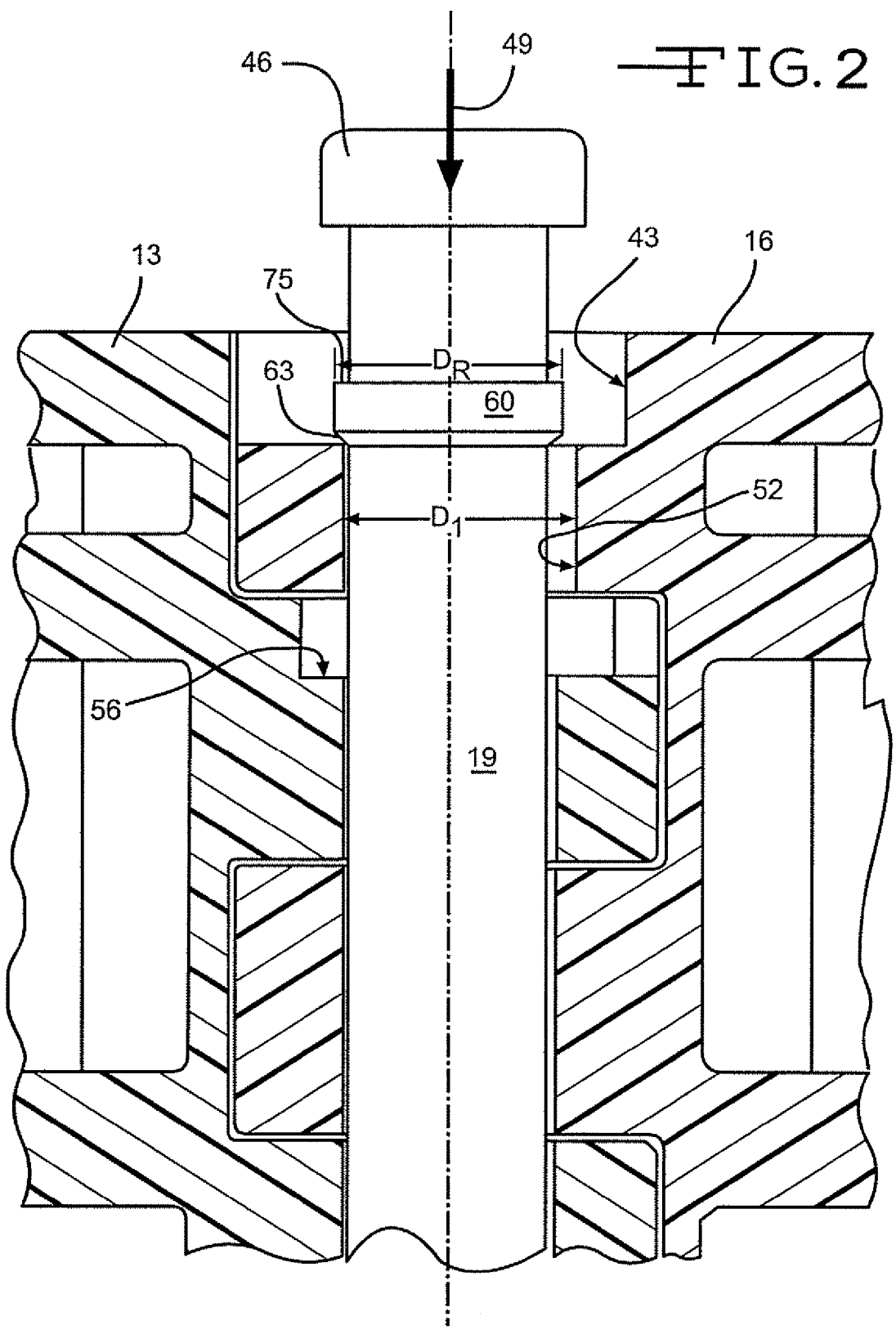
FIG. 2 is a cross-section plan view of the belt and pivot rod of FIG. 1 during the initial stage of installation of the pivot rod.

FIGS. 2-4 illustrate the position of the pivot rod 19 and the modules 13 and 16 during various stages of the installation of the pivot rod 19. In FIG. 2, the pivot rod 19 is shown at the maximum insertion point prior to bending the body or shaft of the pivot rod 19. The rod 19 has been inserted in the direction of arrow 49 until the beveled edge 63 of the retaining ring 60 engages with the edge of the opening 52 on the left hand side of the figure.

Turning to FIG. 3, deflection of the pivot rod 19 to the right side of opening 52 causes the pivot rod 19 to bend such that the retaining ring 60 aligns with the opening 52. The retaining ring 60 is sized to frictionally engage with the inside walls of opening 52 during insertion. Accordingly, the retaining ring may be roughly equal to or slightly larger in diameter $D_r$ than the inside diameter $D_1$ of opening 52. As shown, the left hand side of the beveled edge 63 clears the opening in FIG. 3 so that the retaining ring 60 may be passed through the opening 52.

In FIG. 4, the pivot rod 19 has been inserted such that the retaining ring 60 has passed all the way through opening 52 and has "snapped" back to the left in the area shown in circle 76. Once the left edge of the retaining ring 60 clears the end of the opening 52, the pivot rod 19 returns to its straight configuration. In this position, the belt modules 13, 16 are intercalated and locked together by the retaining ring 60.

Figure 5:
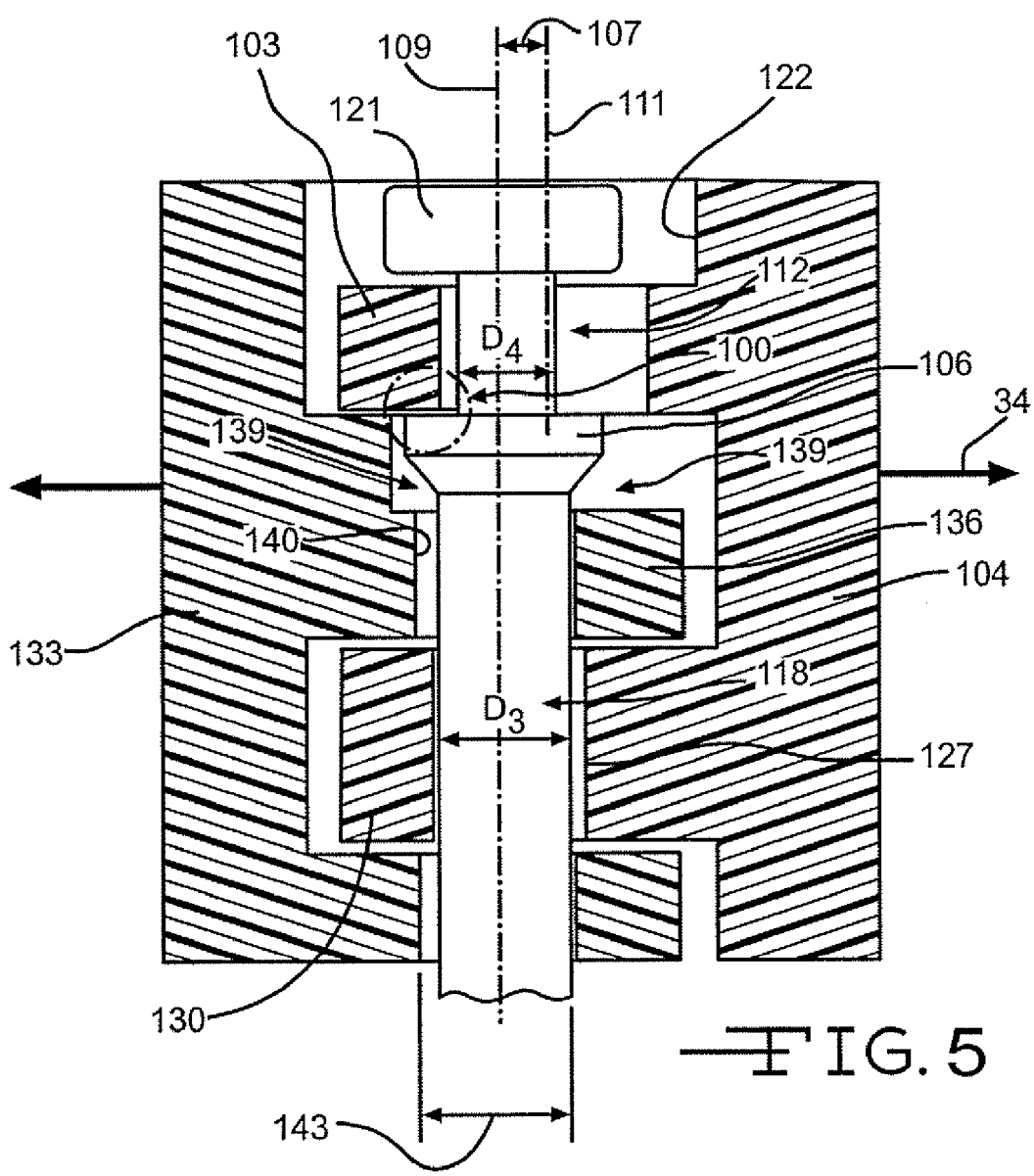
FIG. 5 is a cross-sectional view of the belt and pivot rod of an alternate embodiment of the present invention shown in the installed configuration.

Turning to FIG. 5, an alternate embodiment of the modular belt of the present invention is shown. The overlapping area 100 located between the outermost link end 103 on the first belt module 104 and the rod retaining ring 106 defines the locking behavior of the snap rod. The offset 107 between the pivot rod center axis 109 and the central axis 111 of opening 112 in the outermost link end 103 for the retaining ring 106 is a parameter that affects the locking behavior. This offset 107 can be increased by reducing the diameter $D_4$ of the rod 118 between the head 121 and the retaining ring 106. This arrangement allows the diameter of the retaining ring 106 to be kept slightly less than or equal to the diameter of opening 112 and thus makes removal of the pivot rod easier without weakening the retaining function. The outermost link end 103 has a recessed portion 122 that receives the head 121. The opening 112 in the outermost link end 103 is larger than the openings 127 in the plurality of link ends 130.

The second belt module 133 also has an outermost link end 136 having a recessed portion 139. The recessed portion 139 in the second belt module 133 receives the retaining ring 106 when the first and second belt modules 104, 133 are intercalated and connected by the pivot rod 118. The outermost link end 136 on the second belt module 133 has a pivot rod opening 140 with a diameter 143 that is approximately equal to the diameter of the openings 127 in the first belt module 104.

Figure 6:
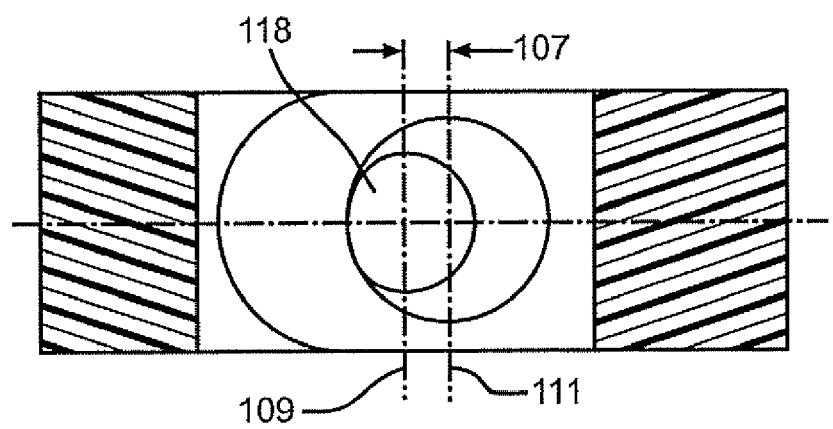
FIG. 6 is an end view of the belt with the pivot rod removed for clarity.

In FIG. 6, the offset 107 is shown from an end view of the intercalated belt modules. The pivot rod axis 109 and the central axis 111 of the opening 112 are shown.

Figure 7:
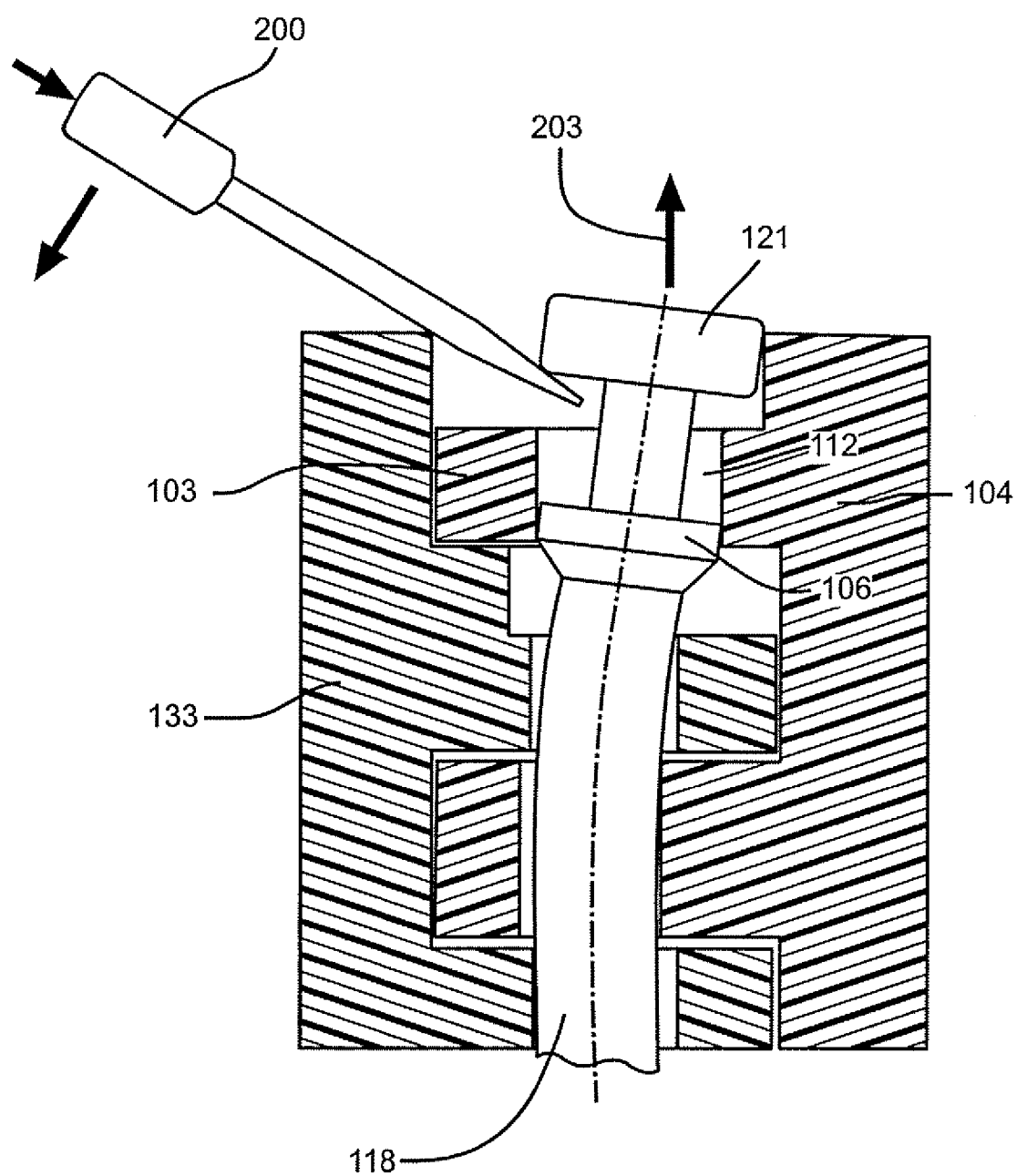
FIG. 7 is a cross-sectional view of the belt shown in FIG. 5 during removal of the pivot rod with a screw driver; and, FIG. 8 is a cross-sectional plan view of an alternate embodiment of the present invention.

As shown in FIG. 7, the pivot rod 118 may be removed by use of a screw driver 200. The screw driver 200 may be inserted under the head 121 of the pivot rod 118 to provide leverage for bending the rod 118 to align it with the opening 112 in the outermost link end 103 in the first module 104. Once the retaining ring 106 is aligned with the opening 112 the pivot rod 118 may be removed by sliding it outward in the direction indicated by arrow 203.

Figure 8:
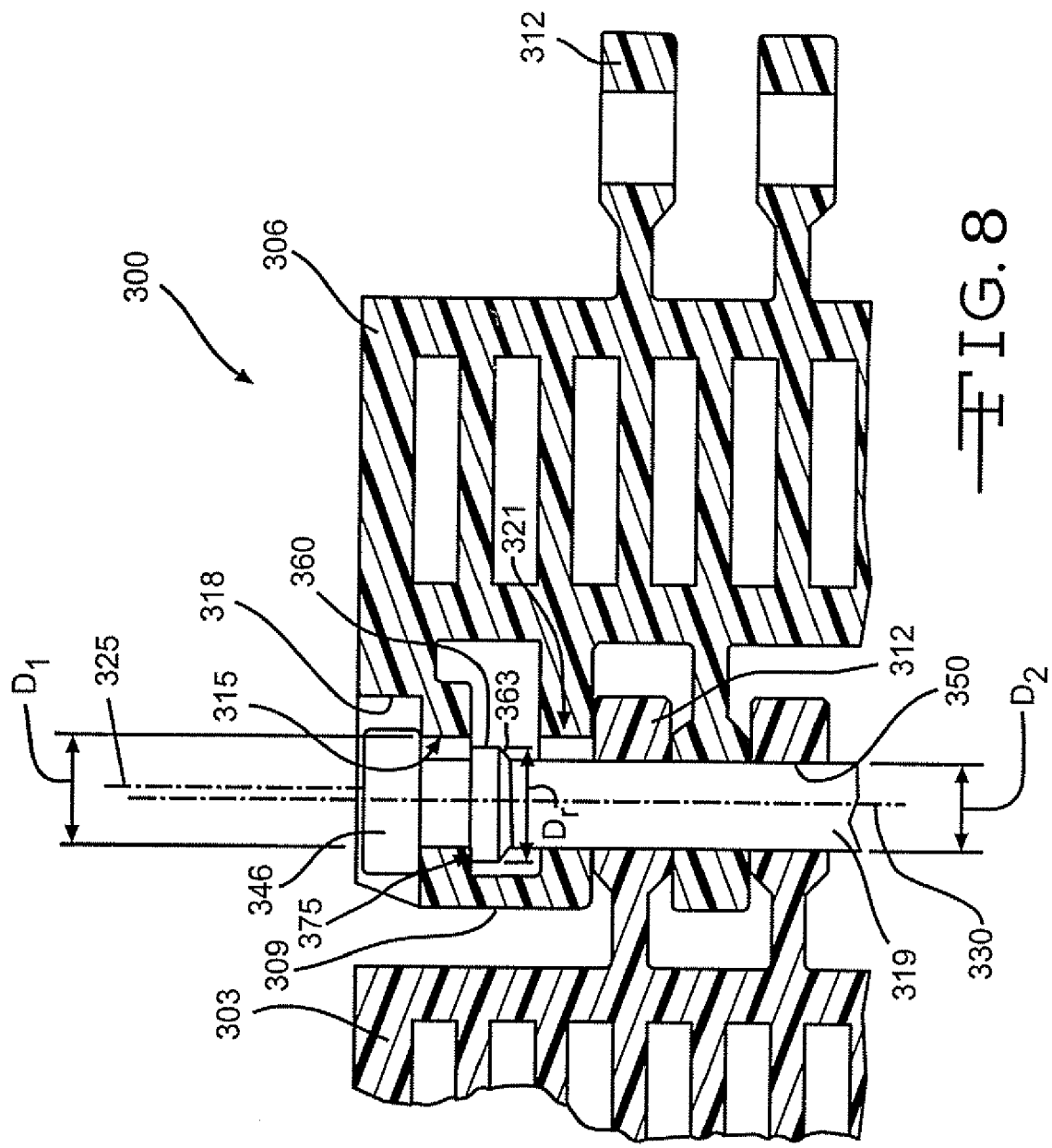
Figure 9:
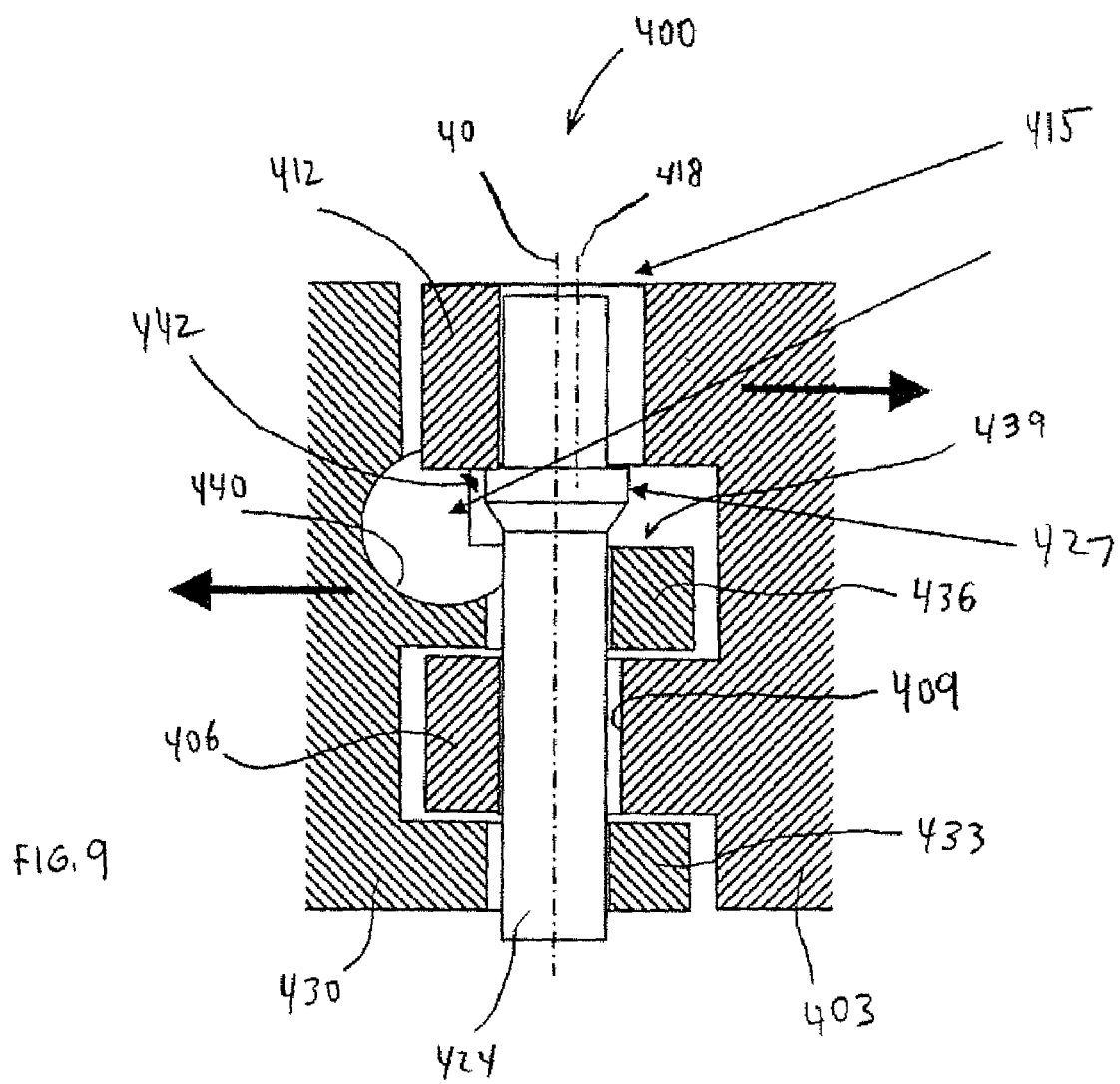
FIG. 9 is a cross-sectional view of an alternate embodiment of a section of the modular belt of the present invention.
Figure 10:
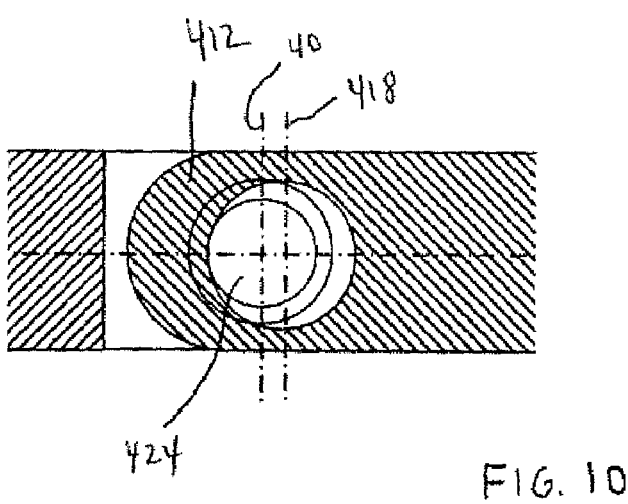
FIG. 10 is a cross-sectional end view of the section shown in FIG. 9.

Turning to FIG. 8, an alternate embodiment of the present invention is shown. A belt 300 is formed from modules 303 and 306. The modules have outer link ends 309, 312. Link end 309 on module 306 has extra width to accommodate an internal opening 315 for receiving retaining ring 360 on pivot rod 319. Link end 312 on module 303 intercalates adjacent to link end 309 as shown. The link end 309 also includes a recessed portion 318 for receiving end portion 346 of pivot rod 319.

Link end 309 also includes an opening 321 having the same diameter as opening 315. Openings 315 and 321 have a diameter $D_1$ that is approximately equal to or smaller than the diameter $D_r$ of ring 360. The link end 312 and the link ends disposed toward the middle of the belt have openings with a Diameter D2 that is smaller than D1. The longitudinal axis 325 of openings 315 and 321 is offset from the longitudinal axis 330 of the opening in link end 312 and the openings toward the middle of the belt module.

Accordingly, during insertion of the pivot rod 319, the pivot rod 319 has to be bent and once the ring 360 clears the opening 315 it shifts to the left with respect to FIG. 8 such that shoulder 375 engages the link surface around opening 315.

The embodiment of FIG. 8 may also be provided with a pivot rod 118 (FIG. 5) having different diameters located above and below the retaining ring 106. In the example shown, the diameter of the rod between the retaining ring and the head is smaller than the diameter of the rod between the retaining ring and the second end of the rod.

Turning to FIGS. 9-12, another embodiment of the invention is shown. A portion of a modular belt 400 is shown in cross-section. A first module 403 has a plurality of link ends 406 having an opening 409 disposed therethrough. The outermost link end 412 on module 403 has an opening 415 disposed therethrough. The opening 415 is wider than the remaining openings 409. Also, the opening 415 has a central axis 418 that is offset from a central axis 421 of openings 409. As discussed previously in connection with the embodiments shown in FIGS. 1-8, the wider opening and offset axis provide for rod retention by means of a pivot rod 424 having an enlarged retaining ring 427. Retaining ring 427 has an outside diameter that is greater than the outside diameter of the pivot rod 424. A second module 430 has a plurality of link ends 433 that have openings 436 that are capable of aligning with openings 409. Link ends 433 fit into spaces disposed between link ends 406. The outermost link end 436 on the second module 430 has a first recess 439 for receiving the enlarged retaining ring 427 when modules 403, 430 are intercalated and connected by pivot rod 424 to form the belt 400. The outermost link end 436 on the second module 430 also has a second recess 440. The second recess 440 is sized to receive the head of a screwdriver or the like. When the pivot rod 424 is inserted into the intercalated modules 403, 430 to form a belt 400, the rod 424 is initially deformed as shown in FIG. 3. Once the retaining ring 427 clears the opening 415, the pivot rod 424 moves to the left of the figure (best shown in FIGS. 4 and 9) and a shoulder 442 formed by the ring 427 and rod 424 abuts with the side surface of link end 412 such that the pivot rod 424 is fixed between the outermost link ends 412, 436 on the first and second belt modules 403, 430 respectively.

Figure 11:
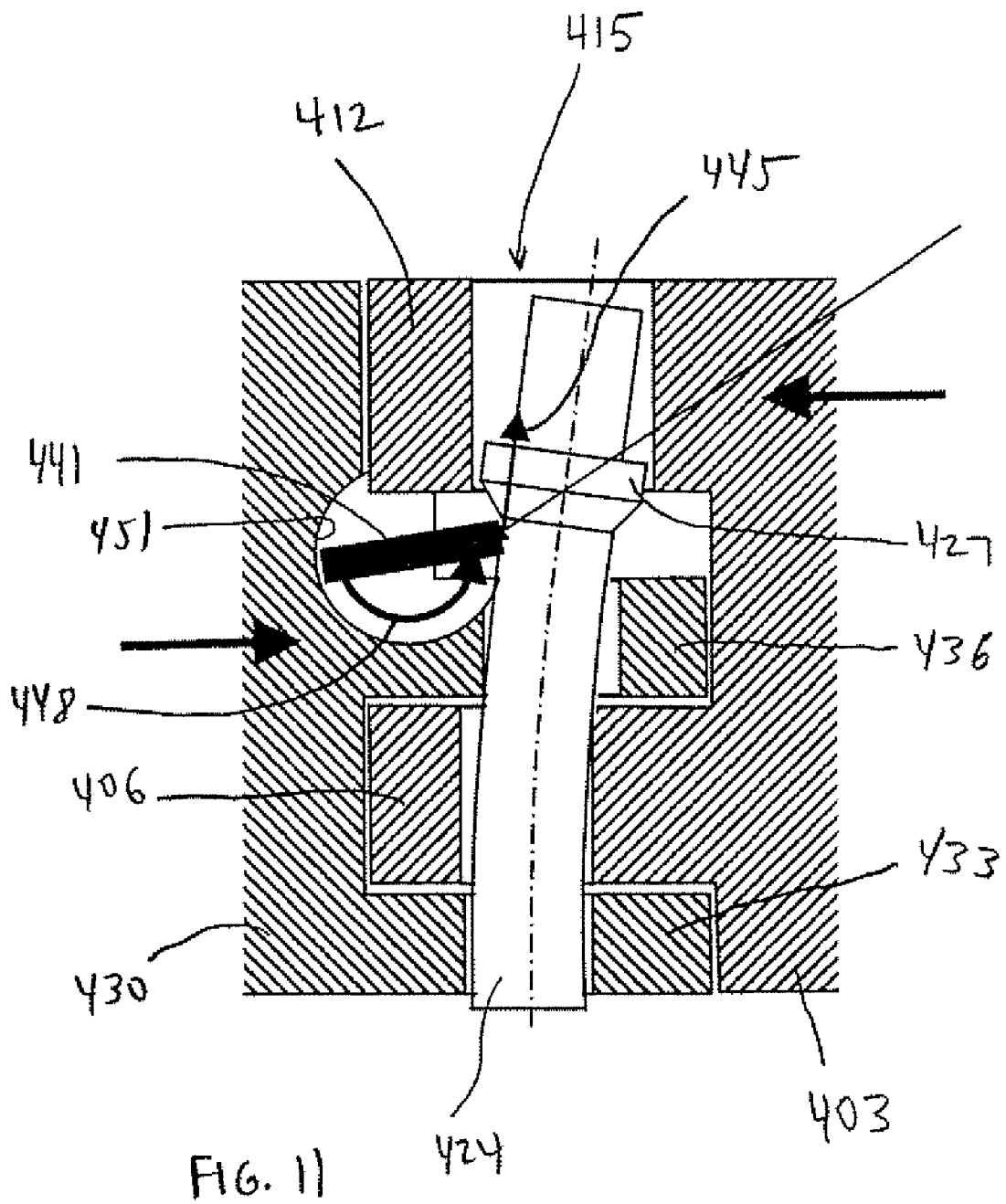
FIG. 11 is a cross-sectional view of a section of the modular belt of the present invention showing removal of the pivot rod by means of the tip of a screwdriver.

The edge of the outermost link end 412 is solid except for the opening 415. The pivot rod 424 does not have a head at the end. The ring 427 is disposed in spaced apart relation to the end of the pivot rod 424. Accordingly, the pivot rod 424 cannot be removed from the edge of the belt 400 in the manner shown in FIG. 7. As shown in FIG. 11, a screwdriver blade 441 or the like can be inserted into the second recess 440 in order to engage with ring 427 to remove the pivot rod 424 in the direction of arrow 445. By rotating the screwdriver blade 441 in the direction of arrow 448, the corner 449 of blade 441 engages with the rod 424 and/or ring 427 to move it to the right with respect to FIG. 11 and then outward in the direction of arrow 445.

Figure 12:
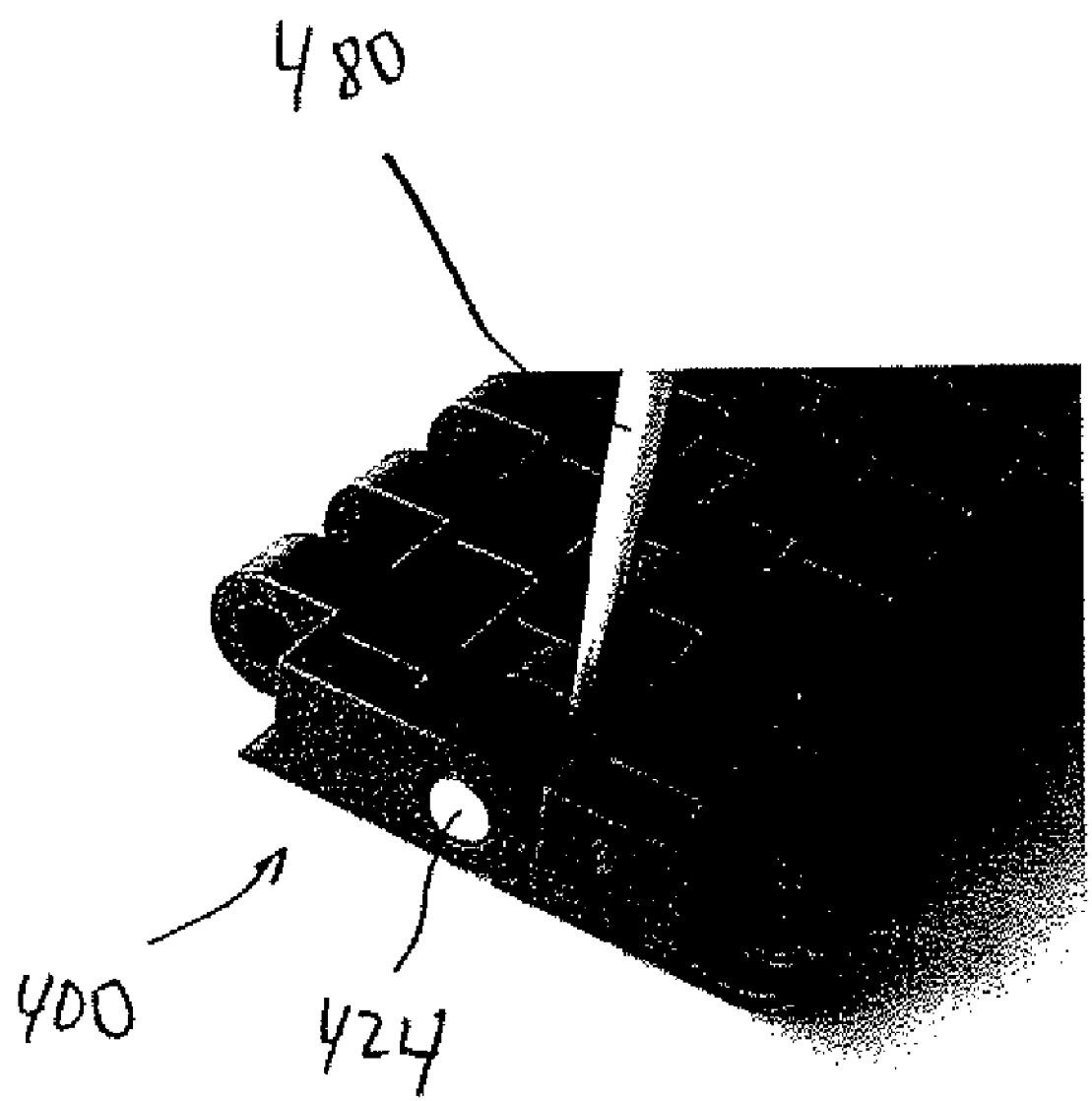
FIG. 12 is a perspective view of a section of the modular belt of the present invention showing removal of the pivot rod by means of a screwdriver.

The curved wall 451 bordering the second recess 440 provides for rotation of the blade 441. As shown in FIG. 12, a standard screw driver 480 with a flat head can be inserted downward from the top of the belt 400 or alternatively upwards from the bottom of the belt 400, in order to remove the pivot rod 424 for disassembling the modules for repair or maintenance.

Figure 13:
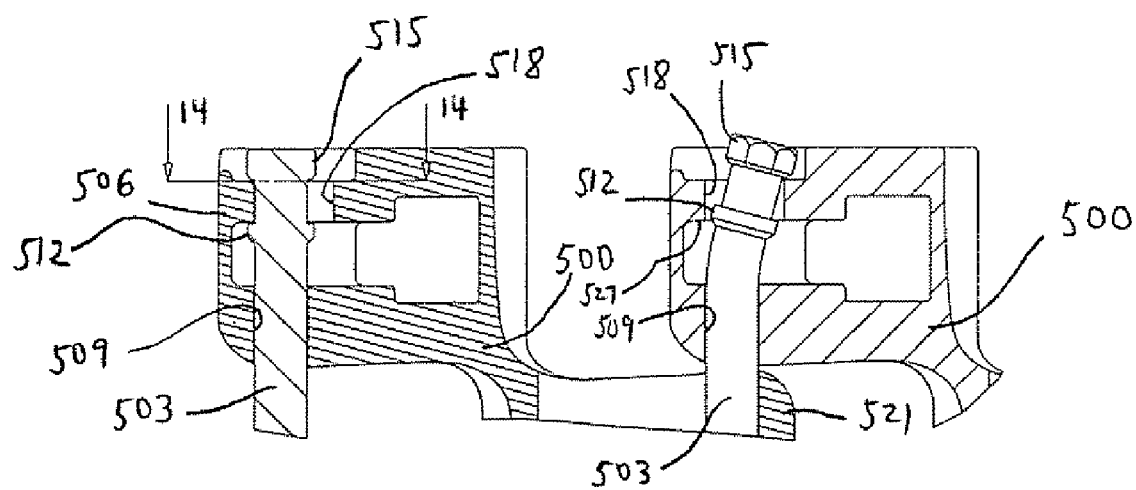
FIG. 13 is a cross-sectional view of an alternate embodiment of the present invention showing a portion of a belt module having a double link configuration.

Turning to FIG. 13, a belt module 500 is shown with a pivot rod 503 retained in a double width outermost link end 506. The link end 506 has a first transverse opening 509 which has a diameter that is slightly larger than the diameter of the pivot rod 503. The pivot rod 503 has a retaining ring 512 that has a diameter that is greater than the diameter of the pivot rod 503. The pivot rod 503 also has a head portion 515 located at the outermost end of the pivot rod 503. The retaining ring 512 is disposed in spaced apart relation to the head portion 515. The link end 506 has a second transverse opening 518 that is offset to the right with respect to the orientation of FIG. 13. The transverse opening 518 is larger than transverse opening 509. Accordingly, pivot rod 503 can be elastically deformed as shown on the right hand side of FIG. 13 to enable the pivot rod 503 to exit from the belt to release the module 500. As shown, a link end 521 extends opposite from link end 506 and is capable of intercalating with an adjacent module 500.

Figure 14:
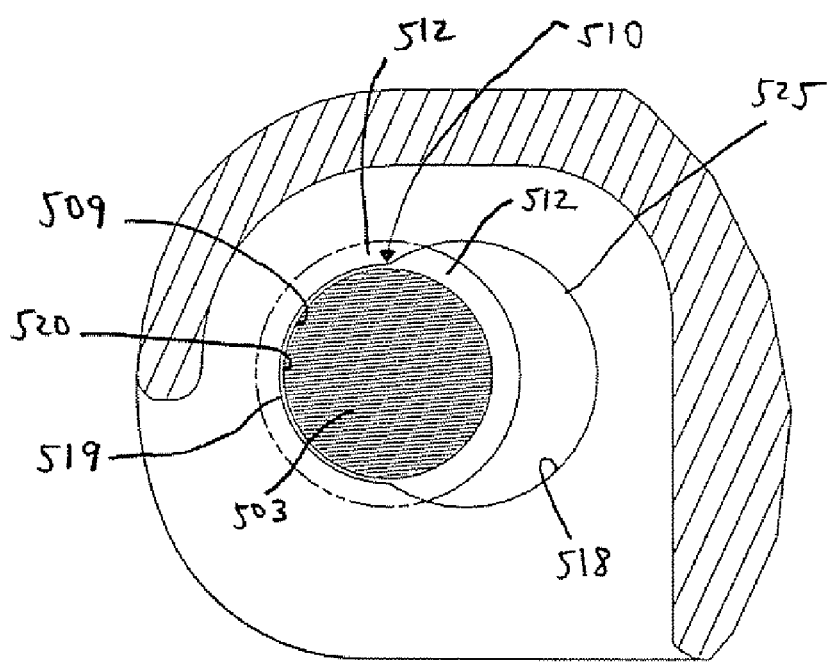
FIG. 14 is a cross-sectional view taken along lines 14-14 of FIG. 13.

Turning to FIG. 14, the outermost transverse opening 518 has an oblong shape that partially overlaps the transverse opening 509. At the left side of opening 518, a curved wall 519 of opening 518 substantially coincides with a curved wall 520 of opening 509. The curved wall 519 of opening 518 coincides with the curved wall 520 of opening 509 until a point 510 on both sides of opening 518 toward the middle of the pivot rod 503 where curved wall 519 terminates and a larger diameter curved wall 525 emerges. The combination of the curved wall 519 and the curved wall 525 forms an oblong shaped opening that partially coincides with the transverse opening 509. As a result of the complex shape for the outer opening 518, the retaining ring 512 overlaps more of the link face 527 (FIG. 13) around opening 518 thereby improving the rod retaining function of the arrangement.

Figure 15:
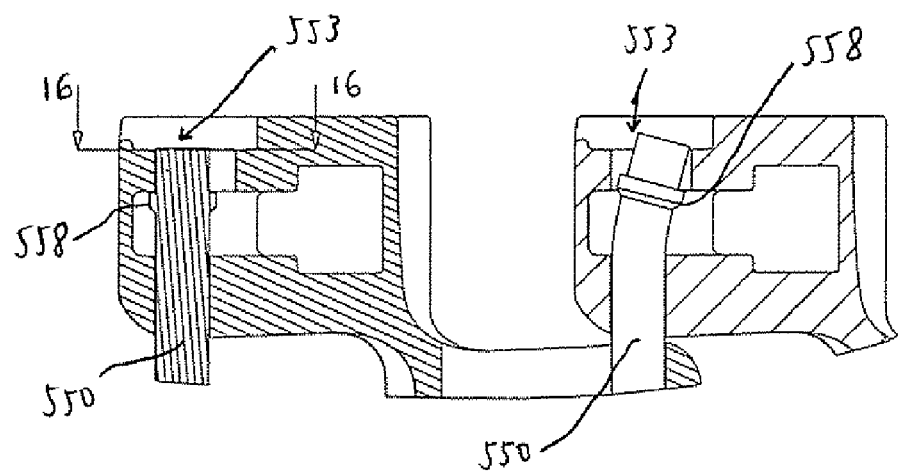
FIG. 15 is a cross-sectional view of a portion of a belt module connected by a headless pivot rod.
Figure 16:
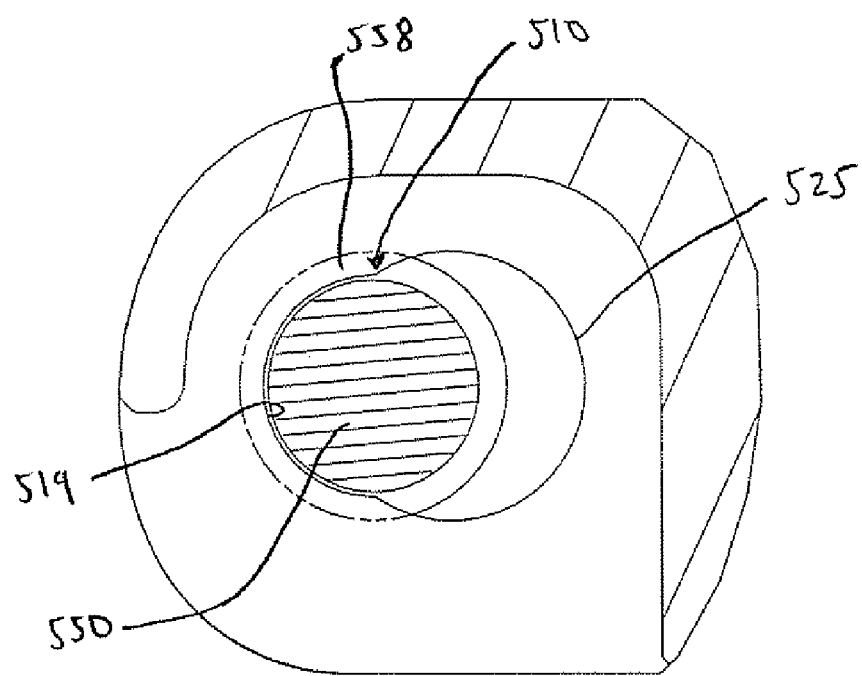
FIG. 16 is a cross-sectional view taken along lines 16-16 of FIG. 15.

Turning to FIGS. 15-16, adjacent modules 500 are shown connected by a headless pivot rod 550. In this version, the module 500 may extend to the belt edge around opening 553. The rod 550 may be removed by inserting a tool or implement into the space inside the outermost double link to pry the rod 550 out by means of engagement with the retaining ring 558. The retaining ring 558 has a larger diameter than pivot rod 550, and the ring 558 provides a leverage point for removing the pivot rod 550 as shown on the right hand side of FIG. 15. As shown in FIG. 16, the outermost transverse opening 518 has an oblong shape with a first curved wall 519 and a second curved wall 525 as described above.

Figure 17:
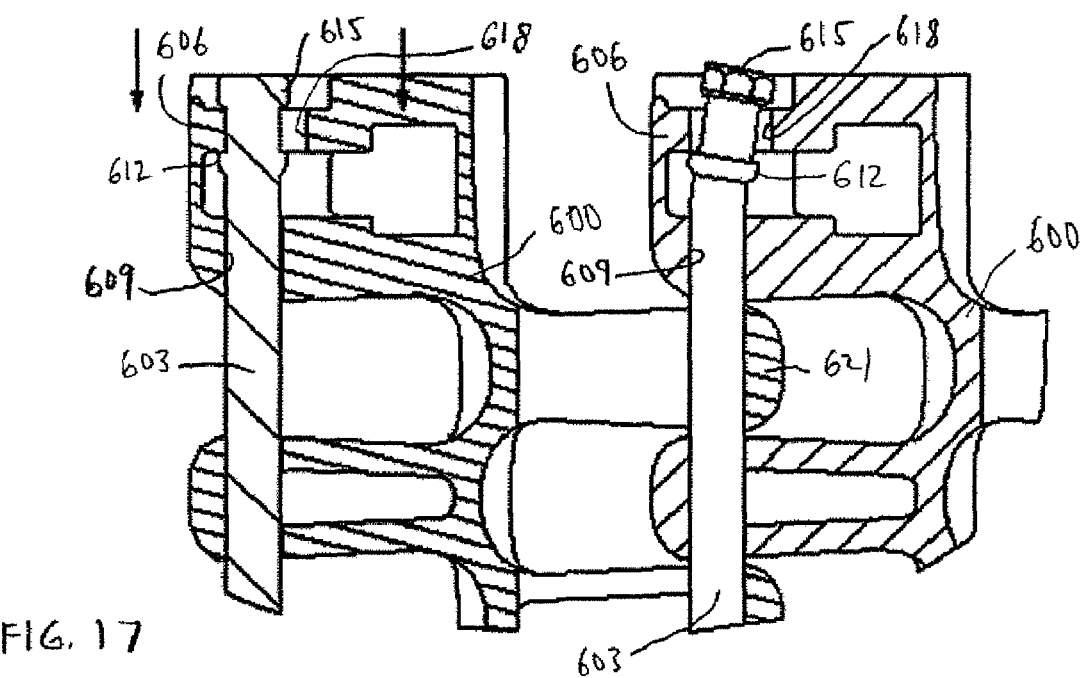
FIG. 17 is a cross-sectional view of another alternative embodiment of the invention showing a portion of a belt module with a double link configuration.
Figure 18:
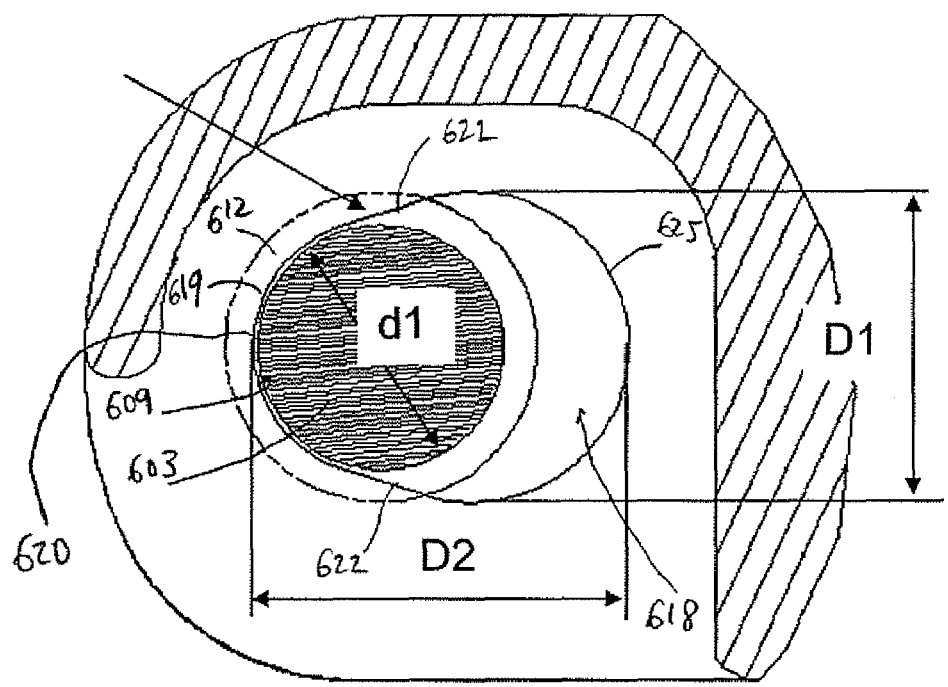
FIG. 18 is a cross-sectional view taken along lines 18-18 of FIG. 17.

Turning to FIGS. 17-18, belt module 600 is shown with a pivot rod 603 retained in a double width outermost link end 606. The link end 606 has a first transverse opening 609 which has a diameter that is slightly larger than the diameter of the pivot rod 603. The pivot rod 603 has a retaining ring 612 that has a diameter that is greater than the diameter of the pivot rod 603. The pivot rod 603 also has a head portion 615 located at the outermost end of the pivot rod 603. The retaining ring 612 is disposed in spaced apart relation to the head portion 615. The link end 606 has a second transverse opening 618 that is offset to the right with respect to the orientation of FIG. 13. The transverse opening 618 is larger than transverse opening 609 Accordingly, pivot rod 603 can be elastically deformed as shown on the right hand side of FIG. 13 to enable the pivot rod 603 to exit from the belt to release the module 600. As shown, a link end 621 extends opposite from link end 606 and is capable of intercalating with an adjacent module 600.

Turning to FIG. 18, the outermost transverse opening 618 has a generally oblong shape that partially overlaps the transverse opening 609. At the left side of opening 618, a curved wall 619 of opening 618 substantially coincides with a curved wall 620 of opening 609. The curved wall 619 of opening 618 coincides with the curved wall 620 of opening 609 until a point toward the middle of the pivot rod 603 where the curved portion terminates and a substantially tangential wall 622 extends on both sides of opening 618 to a larger diameter curved wall 625. The combination of the curved wall 619, tangential wall 622, and the curved wall 625 forms an oblong-shaped opening 618 that partially coincides with the transverse opening 609. As a result of the complex shape for the outer opening 618, the retaining ring 612 overlaps more of the link face 639 (FIG. 17) around opening 618 thereby improving the rod retaining function of the arrangement.

Figure 19:
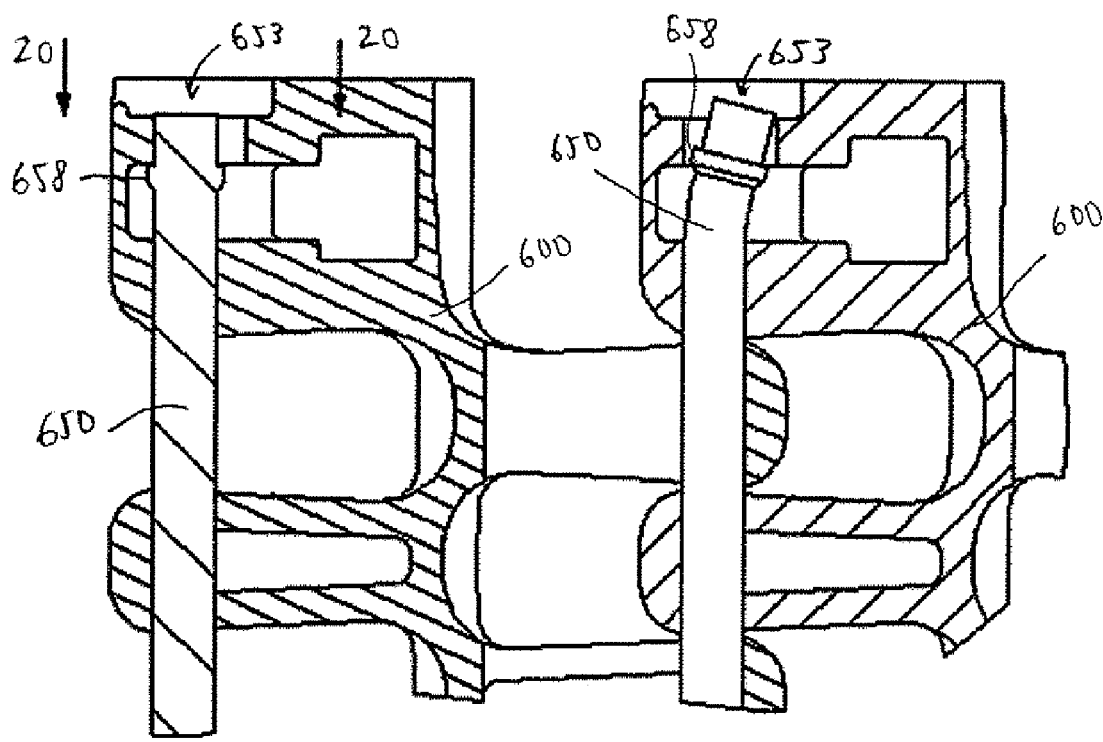
FIG. 19 is a cross-sectional view of another alternate embodiment of the present invention showing a portion of a belt module with a double link configuration connected by a headless pivot rod.
Figure 20:
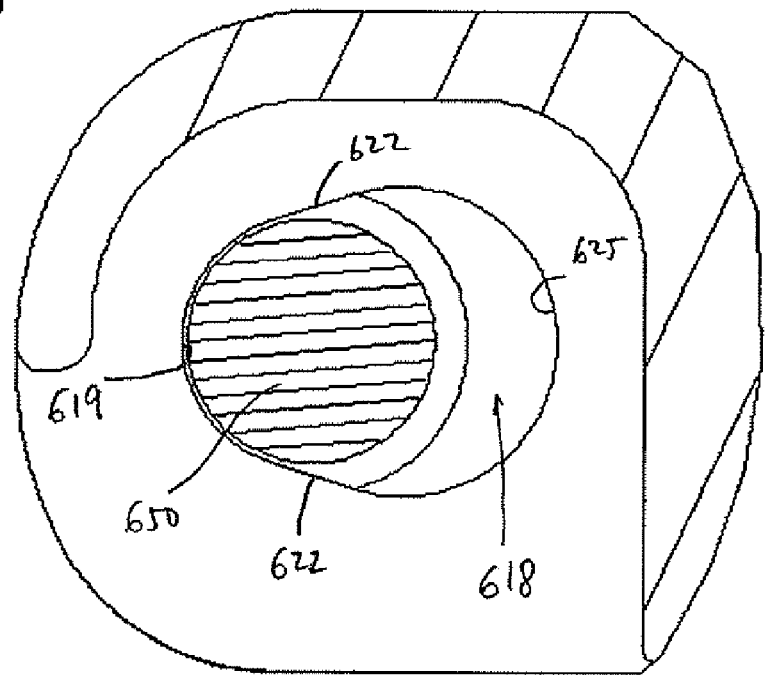
FIG. 20 is a cross-sectional view taken along lines 20-20 of FIG. 19.

Turning to FIGS. 19-20, adjacent modules 600 are shown connected by a headless pivot rod 650. In this version, the module 600 may extend to the belt edge around opening 653. The rod 650 may be removed by inserting a tool or implement into the space inside the outermost double link to pry the rod 650 out by means of engagement with the retaining ring 658. The retaining ring 658 has a larger diameter than pivot rod 650, and the ring 658 provides a leverage point for removing the pivot rod 650 as shown on the right hand side of FIG. 19. As shown in FIG. 20, the outermost transverse opening 618 has an oblong shape with a first curved wall 619 and a second curved wall 625 connected by a substantially tangential wall 622 as described above.

Figure 21:
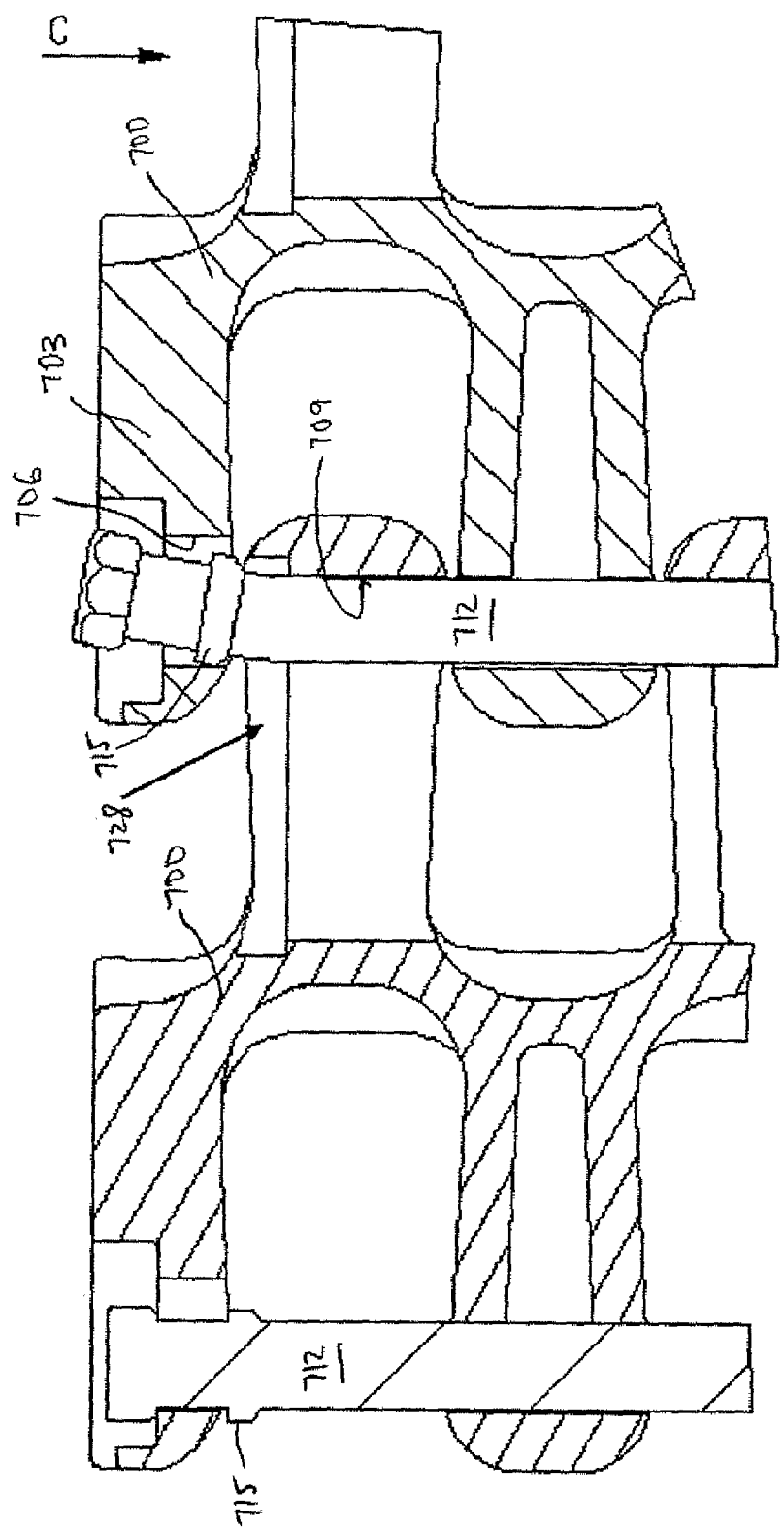
FIG. 21 is a cross-sectional view of an alternate embodiment of the present invention having a single link configuration; and, FIG. 22 is a cross-sectional view of an alternate embodiment of the present invention having a single link configuration.

In FIG. 21, a module 700 having an outermost link end 703 with a single link configuration is shown. The outermost link end 700 has a transverse opening 706 that is larger than the remaining transverse openings 709. Also, transverse opening 706 is offset to the right with respect to the figure such that the pivot rod 712 can be elastically deformed for removal through opening 706 as shown in connection with the pivot rod 712 on the right hand side of the figure. The pivot rod 712 has a retaining ring 715 that has an outside diameter that is larger than the diameter of the pivot rod 712. The adjacent module 700 may be provided with a recessed portion 728 to provide space for the retaining ring 715 when the adjacent modules 700 are intercalated and connected by a pivot rod 712.

Figure 22:
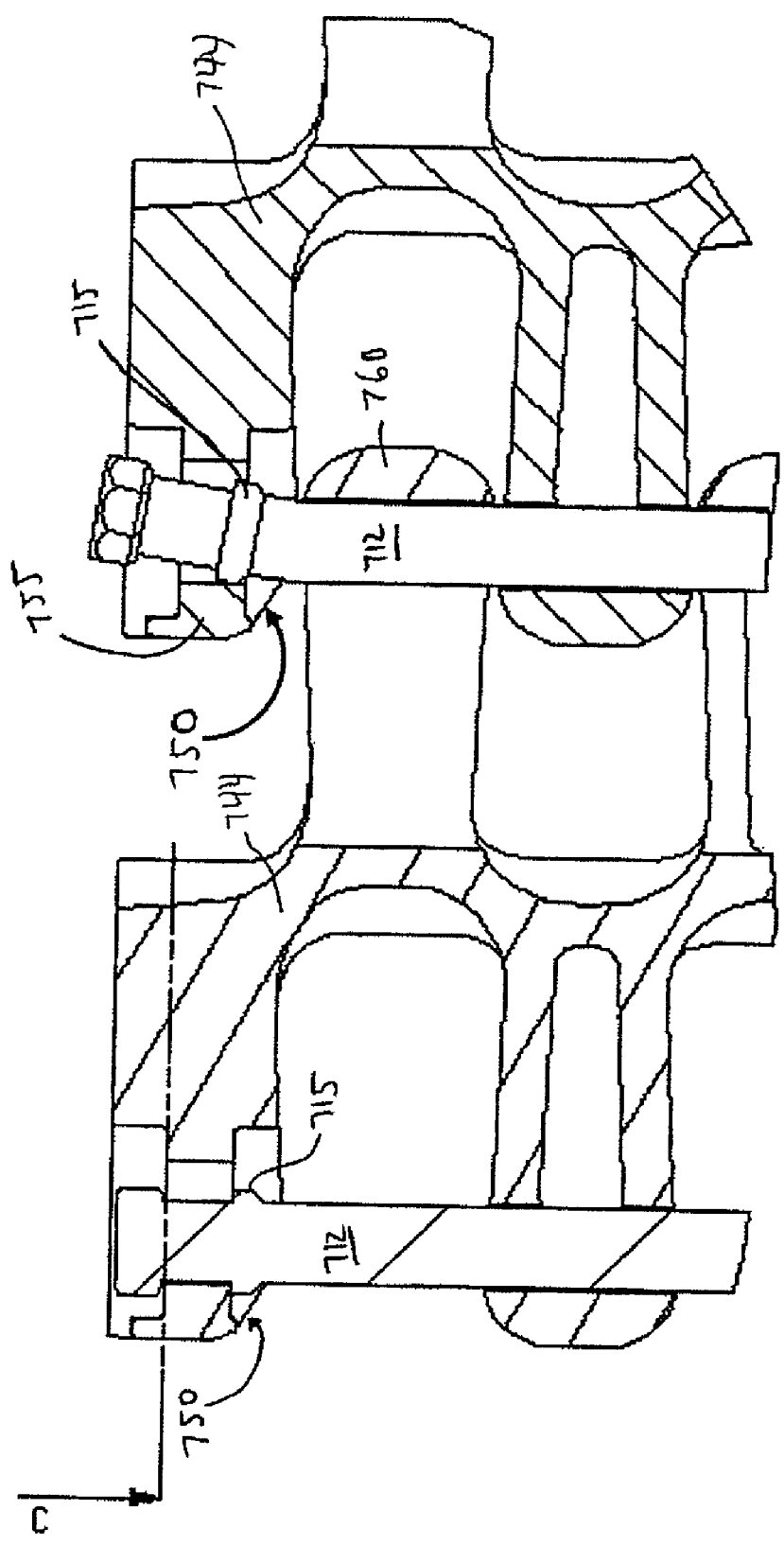

Turning to FIG. 22, an alternative embodiment provides a module 744 having a recess 750 in the outermost link end 755 that faces the link end 760 on the adjacent module 744. When the link ends 755 and 760 are intercalated and the pivot rod 712 is inserted, the retaining ring 715 is disposed in the recess 750 formed in module 744.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A modular belt, comprising:
a plurality of belt modules having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the first transverse thickness between and to the opposed side walls, the first belt module having an outermost link end having opposed side walls providing a second transverse thickness connected to the intermediate section at a second proximal portion and extending from the intermediate section in a direction of belt travel to a second distal portion at the link ends, the outermost link end having a second opening through the second transverse thickness between and to the opposed side walls, the second opening being larger than the first openings, the second opening being offset in the direction of belt travel from a central longitudinal axis of the first openings, the modules having a second p1 plurality of link ends, each link end having opposed side walls providing a first transverse thickness connected to an intermediate section at a first proximal portion and extending from the intermediate section in a direction of belt travel to a first distal portion at the link ends, the second plurality of link ends having third openings through the thickness between and to the opposed sidewalls, the second plurality of link ends having an outermost link end having opposed side walls providing a second transverse thickness connected to the intermediate section at a second proximal portion and extending from the intermediate section in a direction of belt travel to a second distal portion at the link ends, the second transverse thickness having a fourth opening formed therein to receive a tool for engaging with a pivot rod for removal; and,
the pivot rod having a elongate body with a first diameter, the pivot rod having a first end disposed opposite from a second end, the pivot rod having a longitudinal axis disposed transverse to the direction of belt travel, the pivot rod having a retaining ring disposed in spaced apart relation to the first end of the pivot rod in the direction of the longitudinal axis, the pivot rod capable of being disposed through the first, second and third openings in adjacent modules.

2. The modular belt of claim 1, wherein the opening for receiving a tool for pivot rod removal is curved.

3. The modular belt of claim 1, wherein the opening for receiving a tool for pivot rod removal is semi-circular.

4. The modular belt of claim 1, wherein the tool is a screwdriver blade.

5. The modular belt of claim 1, wherein the opening for receiving a tool is formed in a portion of one of the second link ends and a portion of the intermediate section.

6. The modular belt of claim 1, wherein the outermost link end of the first plurality of link ends extends to the edge of the belt around the opening in the outermost link end.

7. The modular belt of claim 1, wherein the pivot rod is headless.

8. A method of removing a rod retaining snap rod from a modular belt, the method comprising:
providing a plurality of modules having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the first transverse thickness between and to the opposed side walls, the first belt module having an outermost link end having opposed side walls providing a second transverse thickness connected to the intermediate section at a second proximal portion and extending from the intermediate section in a direction of belt travel to a second distal portion at the link ends, the outermost link end having a second opening through the second transverse thickness between and to the opposed side walls, the second opening being larger than the first openings, the second opening being offset in the direction of belt travel from a central longitudinal axis of the first openings;

providing a second plurality of link ends extending in the opposite direction from the first plurality of link ends, each link end having opposed side walls providing a first transverse thickness connected to an intermediate section at a first proximal portion and extending from the intermediate section in a direction of belt travel to a first distal portion at the link ends, the second plurality of link ends having third openings through the thickness between and to the opposed sidewalls, the second plurality of link ends having an outermost link end having opposed side walls providing a second transverse thickness connected to the intermediate section at a second proximal portion and extending from the intermediate section in a direction of belt travel to a second distal portion at the link ends, the second transverse thickness having a fourth opening formed therein to receive a tool;

providing a pivot rod having a elongate body with a first diameter, the pivot rod having a first end disposed opposite from a second end, the pivot rod having a longitudinal axis disposed transverse to the direction of belt travel, the pivot rod having a retaining ring disposed in spaced apart relation to the first end of the pivot rod in the direction of the longitudinal axis, the pivot rod capable of being disposed through the first, second and third openings in adjacent belt modules such that the retaining ring is disposed between the sidewall of the outermost link end of one of the modules and the link end of the adjacent module when the modules are intercalated;

inserting a tool into the fourth opening in the outermost second link end; and, engaging the tool with the retaining ring to elastically deform the pivot rod for removal through the opening in the outermost first link end.

9. The method of claim 8, wherein the tool is a screwdriver blade.

10. The method of claim 8, wherein the fourth opening is curved.

11. The method of claim 8, wherein the fourth opening is formed in a substantially semi-circular shape.

12. A modular belt, comprising:
a plurality of belt modules having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the first transverse thickness between and to the opposed side walls, the first belt module having an outermost link end having opposed side walls providing a second transverse thickness connected to the intermediate section at a second proximal portion and extending from the intermediate section in a direction of belt travel to a second distal portion at the link ends, the outermost link end having a second opening through the second transverse thickness between and to the opposed side walls, the second opening having a first portion with a diameter approximately equal to the diameter of the first openings and having a second portion with a diameter greater than the diameter of the first portion, the first belt module having a second plurality of link ends extending in the opposite direction from the first plurality of link ends and having a third transverse opening defined therein; and, a pivot rod having a elongate body with a first diameter, the pivot rod having a first end disposed opposite from a second end, the pivot rod having a longitudinal axis disposed transverse to the direction of belt travel, the pivot rod having a retaining ring disposed in spaced apart relation to the first end of the pivot rod in the direction of the longitudinal axis, the pivot rod capable of being disposed through the first, second and third openings in adjacent modules to form the belt.

13. The belt of claim 12, wherein the first portion of the opening in the outermost first link end is substantially circular-shaped.

14. The belt of claim 13, wherein the second portion of the opening in the outermost first link end is substantially circular-shaped and has a diameter greater than the first portion.

15. The belt of claim 14, wherein the second portion intersects with the first portion at a point along the edge of the opening in the outermost first link end.

16. The belt of claim 14, wherein the first and second portions are connected by a tangential wall defining a portion of the opening in the outermost first link end.

17. The belt of claim 12, wherein the first and second portion of the second opening formed in the outermost link end are connected by a tangential wall.

18. The belt of claim 12, wherein the outermost link end of the first plurality of link ends has a thickness of a single link end.

19. The belt of claim 12, wherein the outermost link end of the first plurality of link ends has a thickness of two link ends.

20. The belt of claim 12, wherein the outermost link end of the first plurality of link ends has a recess capable of receiving the retaining ring when adjacent modules are intercalated.

21. The belt of claim 12, wherein one of the plurality of second link ends has a recess capable of receiving the retaining ring when adjacent modules are intercalated.

* * * * *

UNITED STATES PATENT AND TRADEMARK OFFICE
CERTIFICATE OF CORRECTION

PATENT NO. : 7,331,447 B2
APPLICATION NO. : 11/278602
DATED : February 19, 2008
INVENTOR(S) : Krisl et al.

It is certified that error appears in the above-identified patent and that said Letters Patent is hereby corrected as shown below:

Column 8, Line 17: delete -- p1 --

Signed and Sealed this

First Day of July, 2008

JON W. DUDAS
*Director of the United States Patent and Trademark Office*